United States Patent [19]
Millington et al.

[11] Patent Number: 6,163,269
[45] Date of Patent: Dec. 19, 2000

[54] NAVIGATION SYSTEM WITH ANTI-ALIAS MAP DISPLAY

[75] Inventors: Jeffrey Alan Millington, Rochester Hills; Anthony Albert Slominski, Harrison Township, both of Mich.

[73] Assignee: Magellan DIS, Inc., Rochester Hills, Mich.

[21] Appl. No.: 09/160,068

[22] Filed: Sep. 24, 1998

Related U.S. Application Data

[60] Provisional application No. 60/084,231, May 5, 1998.

[51] Int. Cl.[7] ........................................ G08B 5/00
[52] U.S. Cl. ........................................ 340/815.4; 345/136
[58] Field of Search ........................ 340/815.4; 345/136, 345/147

[56] References Cited

U.S. PATENT DOCUMENTS

| | | | |
|---|---|---|---|
| 4,591,844 | 5/1986 | Hickin et al. | 340/728 |
| 5,065,144 | 11/1991 | Edelson et al. | 340/703 |
| 5,140,315 | 8/1992 | Edelson et al. | 345/136 |
| 5,365,251 | 11/1994 | Denber | 345/136 |
| 5,742,277 | 4/1998 | Gossett et al. | 345/136 |

FOREIGN PATENT DOCUMENTS

| | | |
|---|---|---|
| 4013851 | 11/1991 | Germany . |
| 3211591 | 9/1991 | Japan . |
| 6034382 | 2/1994 | Japan . |

*Primary Examiner*—Jeffery A. Hofsass
*Assistant Examiner*—John Tweel, Jr.
*Attorney, Agent, or Firm*—Carlson, Gaskey & Olds

[57] ABSTRACT

A navigation system includes a display displaying a map of roads from a road database. The navigation system utilizes a palette of colors to display the road and background on the display. The palette preferably includes a plurality of shades for each of a plurality of colors to be displayed including the background color and the road color. The roads on the display are preferably anti-aliased by indexing a different intensity of the shade of the object based upon the relative position of the pixel and an ideal object area.

11 Claims, 1 Drawing Sheet

NAVIGATION SYSTEM WITH ANTI-ALIAS MAP DISPLAY

This application claims priority to U.S. provisional application Serial No. 60/084,231, filed May 5, 1998.

BACKGROUND OF THE INVENTION

The present invention relates generally to in vehicle navigation or route guidance systems, and more particularly to an improved display for such a system.

Navigation systems include a graphical user interface having a display which displays the current position of a vehicle on a map. The display of the roads on the map in particular may include curved or diagonal lines which may appear jagged, due to the limited resolution of the display. Although increasing the resolution of the display would alleviate this problem, this would also increase the cost of the display and the power required for the processor handling the display.

It is known to use anti-aliasing on home computer displays to reduce the jagged appearance of lines which are not perfectly vertical or horizontal, i.e. perfectly aligned with the columns or rows on the display. In the known anti-aliasing technique for computer displays each pixel includes a red, green and blue numerical value which preciously defines the color of that pixel. A displayed line formed as a plurality of discrete pixels is compared mathematically to the ideal desired line. Pixels which are not completely on the ideal line are evaluated mathematically relative to the ideal. For example, one pixel on a line may be half inside and half outside the ideal line. Half of that pixel would ideally be the color of the line or object and the other half of that pixel would ideally be the color of the background. The color of that pixel is altered to a color which is a weighted average of the color of the line and the color of the background. The weighting of the color is proportional to the amount that the pixel is inside versus outside the ideal. For example, if the pixel were 80 percent in the ideal line, the red, green and blue values for that pixel would each be 80 percent of the values for the line plus 20 percent of the values for the background color.

In order to reduce computation time and power, the navigation system may use paletted colors, in which there are only a limited number of colors available at any one time. Each of the palette's colors can be any color. Each pixel in the display includes an index to the color palette indicating the color that the pixel is to be displayed. The color that is the weighted average of the line or object in background is probably not available. As a result, the bordering pixels in a line or object on a navigation system display cannot be anti-aliased according to the known technique.

SUMMARY OF THE INVENTION

The navigation system of the present invention provides a map display which utilizes anti-aliasing with paletted colors. The palette includes a plurality of colors, each having a plurality of shades or intensities. The road lines are displayed in one color against a background of a different color.

Each pixel in a road line is mathematically compared to the shape of the ideal road line and then displayed at an appropriate shade of the color. If the pixel is completely within the ideal road line the pixel is displayed at the highest intensity of the road line color. The intensity of that color is reduced proportionally for pixels which are not completely within the ideal. Preferably, a color which is mathematically determined to be less than a predetermined threshold would be switched to the background color rather than reduced further in intensity.

BRIEF DESCRIPTION OF THE DRAWING

The above, as well as other advantages of the present invention, will become readily apparent to those skilled in the art from the following detailed description of a preferred embodiment when considered in the light of the accompanying drawing in which.

DETAILED DESCRIPTION OF THE PREFERRED EMBODIMENT

Figure 1:
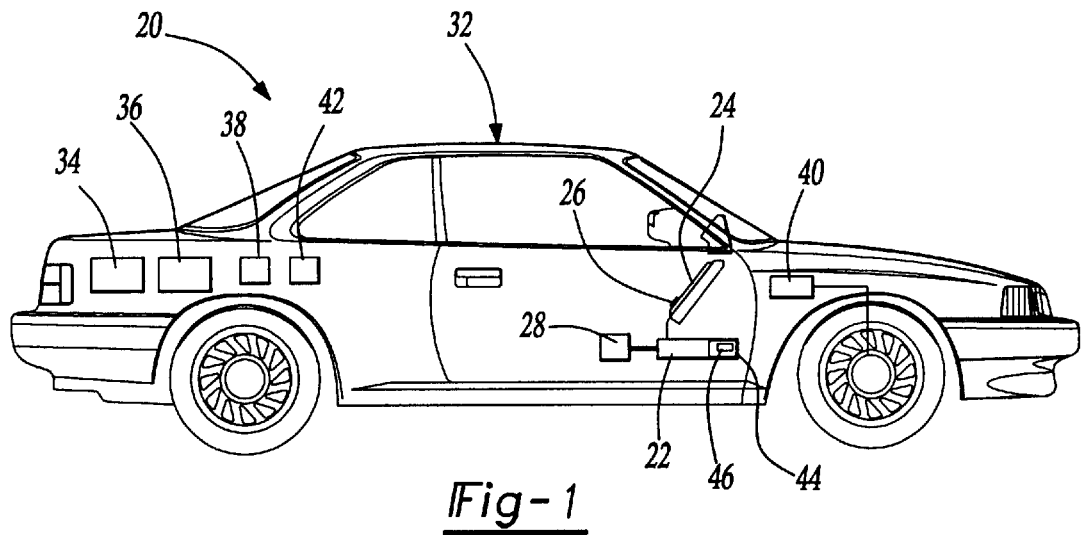
FIG. 1 is a schematic of the navigation system of the present invention.

The navigation system 20 of the present invention is shown schematically in FIG. 1. The navigation system 20 includes a CPU 22 connected to a display 24, such as a high resolution LCD or flat panel display. The CPU 22 is also connected to an input device 26 such as a mouse, keyboard, key pad, microphone or remote device. Alternatively, the display 24 can be a touch screen display. The navigation system 20 further includes a storage device 28, such as a hard drive 28 or CD ROM, connected to the CPU 22. The storage device 28 contains a database including a map of all the roads in the area to be traveled by the vehicle 32 and may contain the software for the CPU 22, including the graphical user interface, route guidance, operating system, position-determining software, etc.

The navigation system 20 preferably includes position and motion determining devices, such as a GPS receiver 34, a gyroscope 36, a compass 38, a wheel speed sensor 40 and an orthogonal multiple axis accelerometer 42 all connected to the CPU 22 (connections not shown for simplicity). Such position and motion determining devices are well known and are commercially available.

The navigation system 20 determines the position of the vehicle 32 relative to the database of roads utilizing the position and motion determining devices. The driver selects a destination relative to the database of roads utilizing the user input device 26 and the display 24. The navigation system 20 then displays turn-by-turn instructions to the driver to guide the driver to the desired destination from the present position.

In the present invention, the CPU 22 includes memory 44, preferably RAM or flash RAM, storing the necessary software and data as well as a palette 46 of colors which can be displayed on the display 24 at one time. The color palette 46 is generally a known technique for displaying colors in computers and in navigation systems. Preferably, the palette 46 contains 256 colors including 5 colors of 16 shades each.

Figure 2:
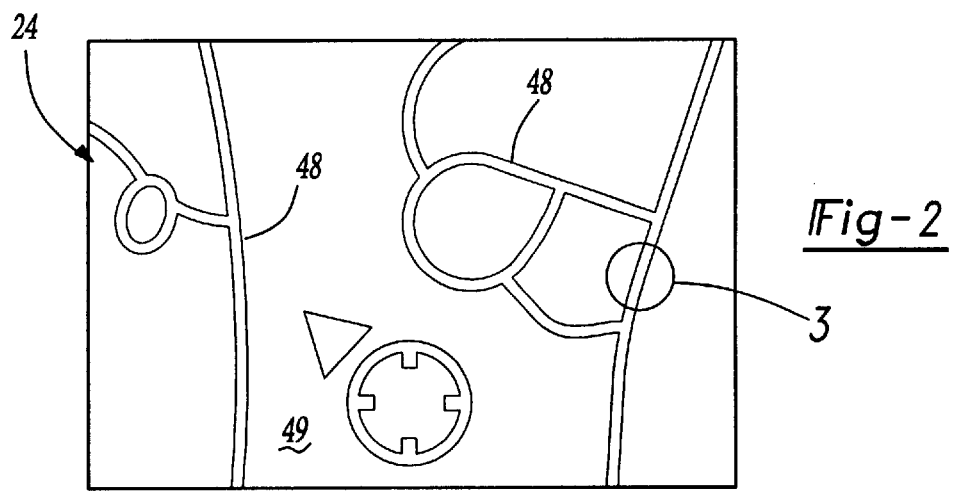
FIG. 2 is a map displayed by the display of FIG. 1.

The operation of the display 24 will be described with respect to displaying maps, as shown in FIG. 2, for illustration purposes. It should be recognized that the same technique could be used for displaying icons, menus and other objects on the display 24. FIG. 2 shows the display 24 of FIG. 1 displaying a map of roads 48 displayed against a background 49.

Figure 3:
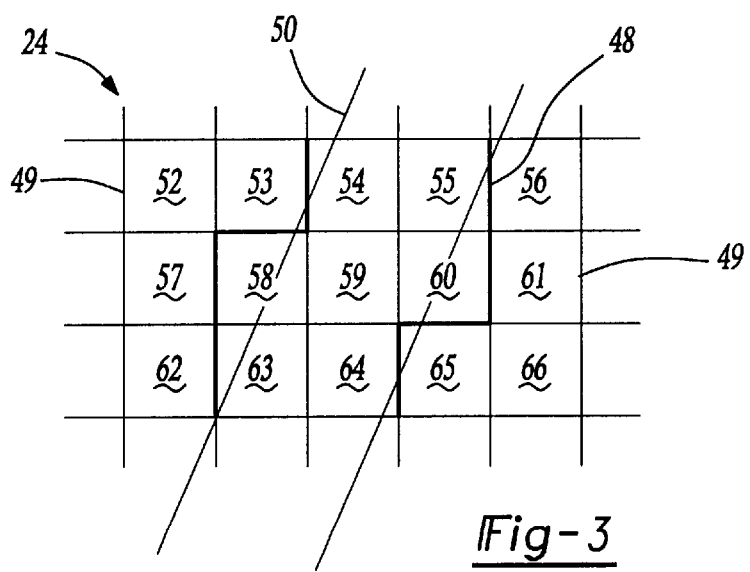
FIG. 3 is an enlarged view of a area 3 of FIG. 2.

FIG. 3 illustrates a portion of a road 48 on display 24 from FIG. 2, compared to the ideal road 50. The road 48 shown in FIG. 3 could be alternatively be a portion of text, icon or other displayed object from FIG. 2. In a manner similar to a well known anti-aliasing algorithm, the pixels in the road 48 are compared with ideal road 50. In the present invention using paletted colors the road 48 is displayed in a first color adjacent a background 49 of a second color. Each pixel 53-55, 58-60 and 63-65 is mathematically compared to the ideal road 50 and then displayed at an appropriate shade of the color. Each of the 5 colors has 16 shades available, 0–15, with 15 having the highest intensity and 0 having the lowest intensity. If the pixel is completely within the ideal road 50, the pixel is displayed at shade level 15, the highest intensity of the first color. The intensity of that color is reduced proportionally for pixels which are not completely within the ideal road 50. Preferably, a pixel for which it is mathematically determined should be less than level 4 would be simply switched to the color of the background 49 rather than reduced in intensity further.

Referring specifically to FIG. 3, pixels 52, 56, 57, 61, 62 and 66 are 0% in the ideal object 50 and are therefore 100% the color of the background 49. Similarly, pixel 59 is 100% within the ideal and therefore has level 15 intensity for the first color of the road 48. Pixels 54 and 64 are approximately 95% within the ideal object and therefore preferably have a level 14 intensity of the first color of the road 48. Pixels 55 and 63 are approximately 75% within the ideal object 50 and are therefore preferably assigned level 13 intensity for the color of the road 48. Pixels 53, 58, 60 and 65 are less than 50% within the ideal object 50 and are therefore assigned the color of the background 49.

The navigation system 20 of the present invention provides a simple and efficient technique which improves the display of the roads. The overall appearance of the display 24 is improved without the need to increase the resolution of the display 24 or the power requirement of the CPU 22.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for displaying a map in a navigation system including the steps of:
   a. providing a palette having a plurality of shades of each of a plurality of colors;
   b. displaying each of a plurality of pixels at one of the plurality of colors;
   c. displaying the map including a plurality of road lines; and
   d. anti-aliasing the road lines utilizing the plurality of colors.

2. The method of claim 1 further including the steps of:
   e. utilizing the plurality of shades in the palette to anti-alias the road lines; and
   f. displaying the road lines as a first color of the plurality of colors against a background of a second color of the plurality of colors.

3. The method of claim 2 further including the steps of:
   g. comparing each of the pixels to an ideal road line; and
   h. varying an intensity of the color of the pixels based upon said step g.

4. The method of claim 3 wherein said intensity of the color is varied in said step h by selecting one of the shades of the first color and displaying different pixels in the road lines as different shades of the first color.

5. The method of claim 4 further including the step of reducing the intensity of the first color of the pixel proportionally to a portion of the pixel not lying within the ideal road line.

6. The method of claim 5 further including the steps of:
   displaying at least one of the pixels at the background color based upon a threshold portion of one of said pixels not being within the ideal road line.

7. A display system for a navigation system comprising:
   a palette of a plurality of intensities of each of a plurality of colors;
   an array of pixels, each selectively illuminated at one of said intensities of said colors;
   said pixels selectively illuminated to display a road line of a first color of said plurality of colors against a background of a second color of said plurality of colors, said pixels comprising said road line being displayed at different intensities of said first color from said palette.

8. The display system of claim 7 wherein pixels comprising said road line are compared to an ideal road line, said intensities of said pixels being varied based upon said comparison.

9. The display system of claim 8 wherein said pixels comprising said road line are displayed at varying intensities from said palette proportionally to the overlap of said pixels with said ideal road line.

10. The display system of claim 9 wherein pixels having overlap of said ideal line less than a predetermined threshold greater than zero are displayed at the color of the background.

11. A display system for a navigation system comprising:
   a palette of a plurality of intensities of each of a plurality of colors;
   an array of pixels, each selectively illuminated at one of said intensities of said colors;
   said pixels selectively illuminated to display a road line of a road color of said plurality of colors against a background color of said plurality of colors, said pixels comprising said road line being compared to an ideal road line, said pixels displayed at varying intensities of said road color from said palette based upon said comparison proportionally to the overlap of said pixels with said ideal road line and pixels having overlap of said ideal line less than a predetermined threshold greater than zero are displayed at the color of the background.

* * * * *

US006163269C1

(12) EX PARTE REEXAMINATION CERTIFICATE (9872nd)
United States Patent
Millington et al.

(10) Number: US 6,163,269 C1
(45) Certificate Issued: Oct. 15, 2013

(54) NAVIGATION SYSTEM WITH ANTI-ALIAS MAP DISPLAY

(75) Inventors: Jeffrey Alan Millington, Rochester Hills, MI (US); Anthony Albert Slominski, Harrison Township, MI (US)

(73) Assignee: Beacon Navigation GmbH, Zug (CH)

Reexamination Request:
No. 90/012,270, Apr. 26, 2012

Reexamination Certificate for:
Patent No.: 6,163,269
Issued: Dec. 19, 2000
Appl. No.: 09/160,068
Filed: Sep. 24, 1998

Related U.S. Application Data

(60) Provisional application No. 60/084,231, filed on May 5, 1998.

(51) Int. Cl.
*G01C 21/36* (2006.01)
*G01C 21/34* (2006.01)
*G09G 5/02* (2006.01)

(52) U.S. Cl.
USPC ............................. 340/815.4; 345/611

(58) Field of Classification Search
None
See application file for complete search history.

(56) References Cited

To view the complete listing of prior art documents cited during the proceeding for Reexamination Control Number 90/012,270, please refer to the USPTO's public Patent Application Information Retrieval (PAIR) system under the Display References tab.

*Primary Examiner* — Minh Dieu Nguyen

(57) ABSTRACT

A navigation system includes a display displaying a map of roads from a road database. The navigation system utilizes a palette of colors to display the road and background on the display. The palette preferably includes a plurality of shades for each of a plurality of colors to be displayed including the background color and the road color. The roads on the display are preferably anti-aliased by indexing a different intensity of the shade of the object based upon the relative position of the pixel and an ideal object area.

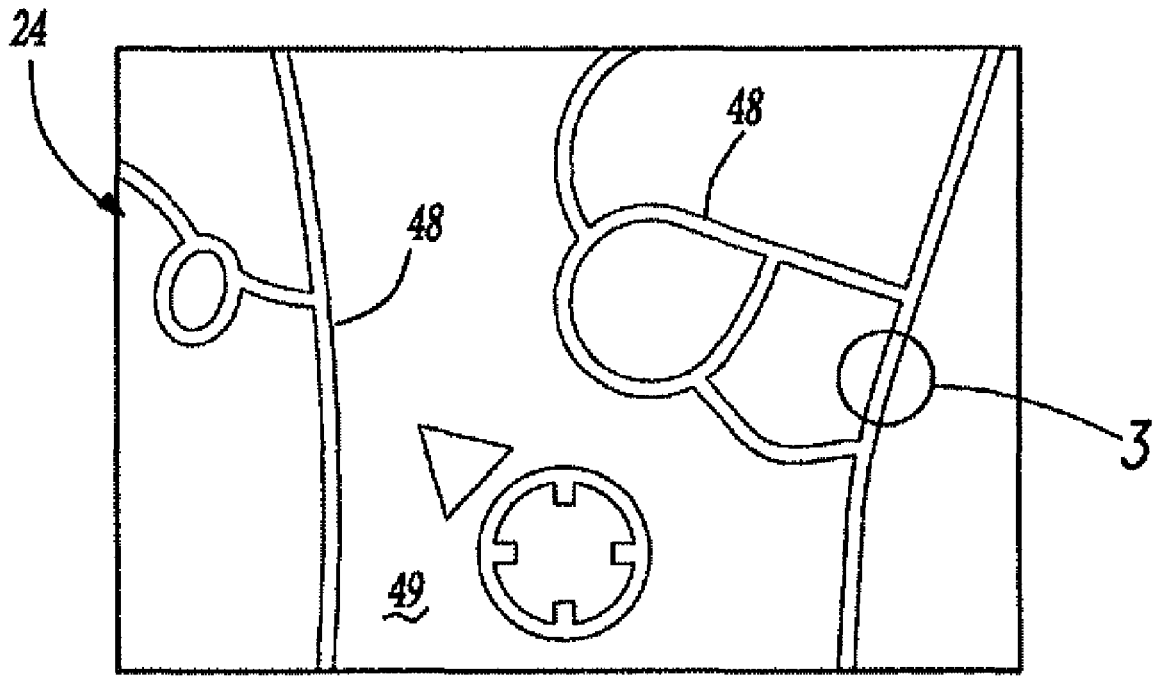

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 7 and 11 are cancelled.

Claims 2-6 and 8-10 were not reexamined.

\* \* \* \* \*